(12) United States Patent
Rokicki et al.

(10) Patent No.: US 8,240,212 B2
(45) Date of Patent: Aug. 14, 2012

(54) INDUCTION SENSOR TO MEASURE VIBRATIONS OF A TURBO-MACHINE ROTOR BLADE

(75) Inventors: Edward Rokicki, Oksa (PL); Jaroslaw Spychala, Warsaw (PL); Ryszard Szczepanik, Warsaw (PL); Pawel Majewski, Warsaw (PL)

(73) Assignee: Instytut Techniczny Wojsk Lotniczych (PL)

( * ) Notice: Subject to any disclaimer, the term of this patent is extended or adjusted under 35 U.S.C. 154(b) by 170 days.

(21) Appl. No.: 12/477,497

(22) Filed: Jun. 3, 2009

(65) Prior Publication Data
US 2009/0314091 A1    Dec. 24, 2009

(30) Foreign Application Priority Data
Jun. 23, 2008 (PL) .......................................... 385979

(51) Int. Cl.
*G01H 11/00* (2006.01)

(52) U.S. Cl. .......................................... 73/660

(58) Field of Classification Search .................... 73/660; 324/207.15
See application file for complete search history.

(56) References Cited

U.S. PATENT DOCUMENTS

| | | | | |
|---|---|---|---|---|
| 2,575,710 A * | 11/1951 | Hardigg | ........................ | 73/660 |
| 2,985,823 A * | 5/1961 | Wright, Jr. | ............... | 324/207.16 |
| 3,600,934 A * | 8/1971 | Hendrix et al. | ................. | 73/570 |
| 4,026,142 A * | 5/1977 | Jacobs | ............................ | 73/578 |
| 4,026,660 A * | 5/1977 | Ueda et al. | ...................... | 416/61 |
| 4,482,859 A * | 11/1984 | Fournier | ........................ | 324/661 |
| 4,934,192 A * | 6/1990 | Jenkins | ........................... | 73/660 |
| 4,967,153 A * | 10/1990 | Langley | ........................ | 324/174 |
| 7,023,205 B1 * | 4/2006 | Krupp | ........................... | 324/239 |
| 7,392,713 B2 * | 7/2008 | Barkhoudarian | ........ | 73/862.331 |
| 8,125,215 B2 * | 2/2012 | Rokicki et al. | ............ | 324/207.15 |
| 2005/0127905 A1 * | 6/2005 | Proctor et al. | ........... | 324/207.15 |

* cited by examiner

*Primary Examiner* — Lisa Caputo
*Assistant Examiner* — Octavia Davis-Hollington
(74) *Attorney, Agent, or Firm* — Westman, Champlin & Kelly, P.A.; Z. Peter Sawicki

(57) ABSTRACT

An induction sensor measures vibrations of a turbo-machine fan blade. The induction sensor comprises a magnet and an induction coil wound upon the magnet parallel to the lines of the magnetic field generated by the magnet.

2 Claims, 1 Drawing Sheet

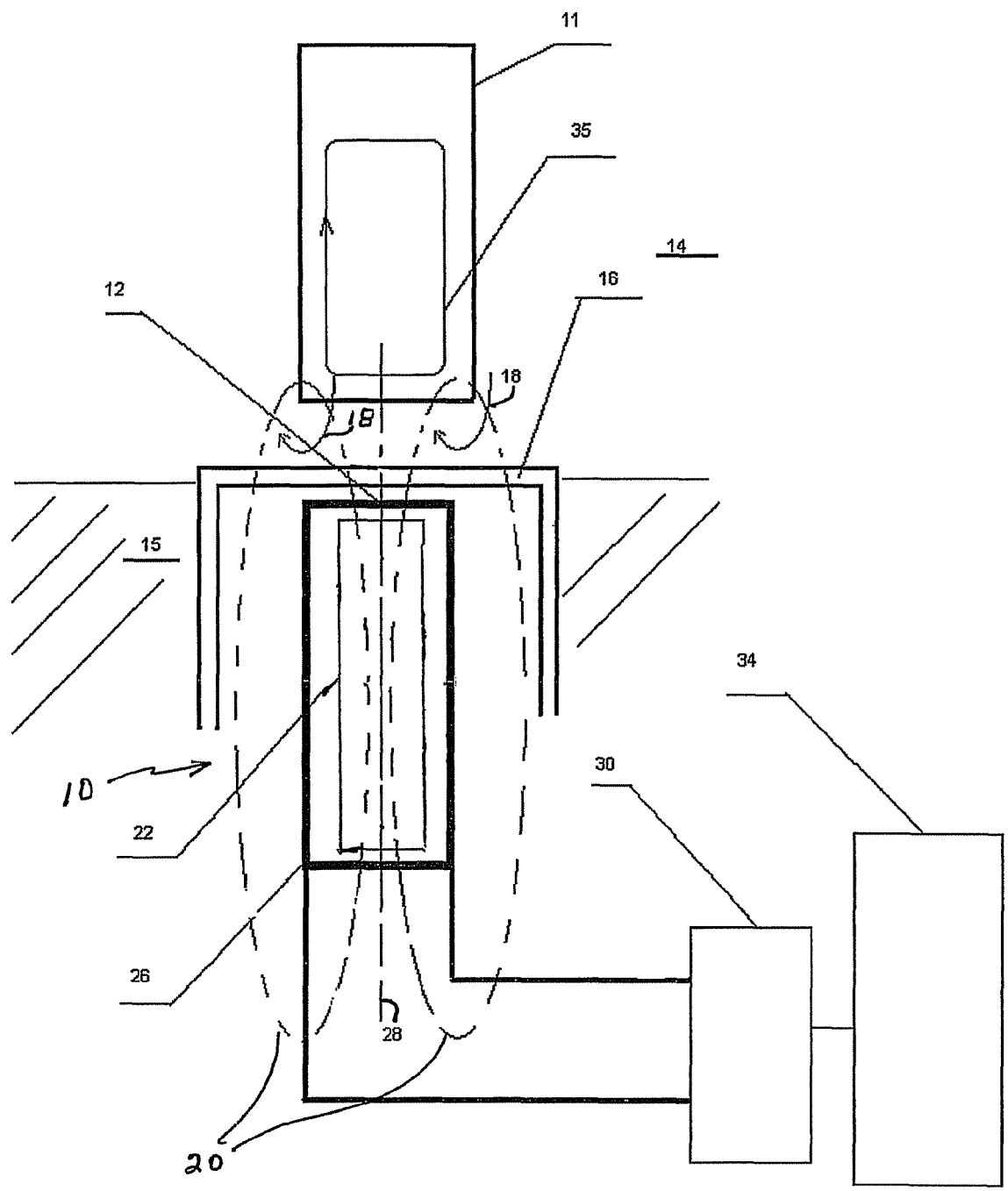

INDUCTION SENSOR TO MEASURE VIBRATIONS OF A TURBO-MACHINE ROTOR BLADE

CROSS-REFERENCE TO RELATED APPLICATION

The present application claims priority of Polish patent application Serial No. P-385979, filed Jun. 23, 2008, and is hereby filed on even date herewith U.S. application titled "Measuring Vibrations of a Turbo-Machine Rotor Blade With the Help of an Induction Sensor in High Temperature" claiming priority from Polish patent application Serial No. P-385627 filed Jun. 9, 2008, both of which are hereby incorporated by reference in their entirety.

BACKGROUND

The invention relates to an induction sensor that measures vibrations of a turbo-machine rotor blade such as a blade in a jet engine. The invention's main application is to measure vibrations of both compressor and turbine rotor blades of a turbine aviation engine.

In the known solution the induction sensor is used for measuring vibrations of a turbo-machine rotor blade, the sensor consisting of a magnet and an induction coil wound over that magnet. The known sensor is used for measuring change in the permanence value of the magnetic field generated by the magnet which fluctuates as a result of the blade's movement in that field. However, such sensors have had performance issues due to the high temperature environment of a jet engine.

SUMMARY

The present invention includes an induction sensor that measures vibrations of a turbo-machine fan blade. The induction sensor comprises a magnet and an induction coil thereon in which the coil of the induction sensor is wound on the magnet parallel to the lines of the magnetic field forces generated by the magnet.

In a further embodiment such a sensor measures currents induced in the blade that are generated as a result of the blades movement in the magnetic field of the magnet.

BRIEF DESCRIPTION OF THE DRAWINGS

The FIGURE is a schematic view of the sensor and magnetic field.

DETAILED DESCRIPTION

The invention solves the problem of measuring vibrations of a turbo-machine rotor blade in a high temperature environment.

The invention's main application is to measure vibrations of both compressor and turbine rotor blades of a turbine aviation engine such as a jet engine.

The invention's feature consists in the fact that the induction coil's winding is parallel to the forces of the magnetic field generated by the magnet. Thanks to such a solution the coil possesses properties of a two-stage electro machine amplifier known as a machine with lateral field, i.e. an amplidyne. The sensor measures currents induced in the blade, generated as a result of the blade's movement in the magnetic field of the magnet.

The induction sensor coil 26 comprises a single shorted coil winding (not divided into primary and/or secondary windings) around the lateral axis 28 of the magnet. The current inducted in the shorted coil is being measured.

It is believed that the shorted coil ensures power (energy) interaction between the magnetic fields of the blade 11 and the sensor 10. The interaction between the magnetic fields of the blade and the sensor creates a scalar electromagnetic moment (according to the Amper Right-Hand Rule with the value of the electromagentic moment depending on the direction of the field vectors.

Eddy currents 35 are being inducted in the blade by the permanent magnet's magnetic field 20. Those eddy currents inducted in the blade are then inducting current in the sensor's coil 26. The current inducted in the coil 26 is being measured. The output voltage of the sensor 10 is proportional to the magnetic induction of the permanent magnet, the cosine of angle between the blade's 11 surface and coil winding 26, and the movement velocity of the blade 11 before the sensor 10. The output voltage is inversely proportional to the radix of the resistivity of the material the blade is made of. The greater the electric conductivity of the blade 11 and lesser resistivity of the blade's material, the stronger is the output electric signal of the sensor 10.

The change of the sensor coil's winding refers to its transverse direction compared to the longitudinal winding in a known coil.

Bending of the blade comes first from its housing on the rotor's rim of blades. Second the bending comes from the rim vibration caused by a gas stream going past the blade in a working engine. The gas stream moves the blades, makes them bend and vibrate. The rim vibrates and changes its position regarding the primary construction setting. So the blade bending comes from both its construction and operational conditions. The direction of the coil winding is parallel to the longitudinal axis of the magnet but the working part of the winding is transverse to lines of the magnetic field forces.

The advantage of the sensor, as used in this invention, is that the effective value of the measurement signal achieved with the help thereof is higher than in the known (prior art) induction sensor. The magnet is a bar magnet having either a square cross-section or a rectangular cross-section and having a length greater than its width with the coil windings taking the shape of the bar magnet when wound around its perimeter. With the coil's winding conforming to the shape of the bar magnet, it becomes possible to measure the angle at which the blade is bent compared to the longitudinal axis of the magnet. Quality of the measurement signal does not depend on the number of the coil's windings, which simplifies the sensor's design. Theoretically, it is believed that the coil's windings may be as low as one winding.

A rotational plane is created by the blade in motion according to the rotational movement of the rim it is housed by. The free end of the magnet having a higher Curie temperature and lower value of the magnetic field creates the face of the sensor, and its other end having a lower Curie temperature and higher value of the magnetic field. Thanks to sensor's ceramic housing, the end of the magnet from the sensor's face is secure against temperatures higher than its Curie temperature and is able to stabilize the electromagnetic field. The Curie temperature of the magnet is higher than the temperature of the surrounding environment. This arrangement ensures an ability of creating a stable magnetic field at high temperatures.

The ceramic housing makes a shield isolating the sensor from the blade operational environment and ensures desired temperature distribution in the sensor and thus the sensor is able to operate in a temperature reaching 800 Celsius degrees. In this application the sensor of this disclosure should be able to measure blade vibrations at high-temperature.

The induction coil structure can be any known structure. The temperature gradient in the ceramic screen protects the magnet from overheating by the operational environment of the blade as the outer surface of the ceramic housing is exposed to a temperature of 1200 Celsius degrees.

A measurement signal is generated in the sensor's coil as a result of the blade's movement in the magnetic field. Eddy currents 35 are induced in blade 11. The eddy currents 35 are sensed by the sensor 10. The signal is received by the sensor and is amplified with the help of an electronic system 30, and then interpreted by a computer 34.

An example of the invention's application is presented in the FIGURE. Winding of the induction coil 26 is wound on the magnet 22, parallel to the lines of the magnetic field forces generated by the magnet 22. The winding of the induction coil 26 has the shape of a frame. The sensor 10 that is created by magnet 22 with the winding of the induction coil 26 measures currents induced in the blade 11, generated as a result of the blade's movement in the magnetic field of the magnet 22, as well as the angle at which the blade 11 is bent compared to the winding frame.

Although the present invention has been described with reference to preferred embodiments, workers skilled in the art will recognize that changes may be made in form and detail without departing from the spirit and scope of the invention.

What is claimed is:

1. An induction sensor to measure vibrations of a turbo-machine blade, the induction sensor consisting essentially of one magnet and one induction coil wound thereon, in which the coil of the induction sensor is wound on the magnet parallel to the lines of the magnetic field forces generated by that magnet and the winding of the induction coil having the shape of a frame, and including one end on the magnet, the end of the magnet positionable such that the magnetic field resulting from the magnet induces a magnetic field in the turbo-machine blade which in turn induces current in the induction coil such that the sensor is capable of measuring the angles at which the turbo-machine blade is bent compared to the frame.

2. The induction sensor of claim 1 wherein the magnet has a cross section that is either substantially square or substantially rectangular.

* * * * *